(12) United States Patent
Gao et al.

(10) Patent No.: US 7,906,757 B2
(45) Date of Patent: Mar. 15, 2011

(54) OPTICAL MOTION SENSING DEVICE WITH AMBIENT LIGHT SENSING

(75) Inventors: Yong Gao, Shanghai (CN); Jian Liu, Shanghai (CN)

(73) Assignee: Apexone Microelectronics Ltd., Shanghai (CN)

( * ) Notice: Subject to any disclaimer, the term of this patent is extended or adjusted under 35 U.S.C. 154(b) by 0 days.

(21) Appl. No.: 11/718,923

(22) PCT Filed: Jul. 12, 2006

(86) PCT No.: PCT/CN2006/001650
§ 371 (c)(1),
(2), (4) Date: Jan. 21, 2009

(87) PCT Pub. No.: WO2008/009173
PCT Pub. Date: Jan. 24, 2008

(65) Prior Publication Data
US 2009/0121120 A1    May 14, 2009

(51) Int. Cl.
*G06M 7/00* (2006.01)
*G06F 3/033* (2006.01)
(52) U.S. Cl. .......................................... 250/221; 345/166

(58) Field of Classification Search ............... 250/221, 250/214 AL; 345/163–166
See application file for complete search history.

(56) References Cited

U.S. PATENT DOCUMENTS

| | | | | |
|---|---|---|---|---|
| 4,647,771 A | * | 3/1987 | Kato | 250/237 R |
| 6,765,555 B2 | * | 7/2004 | Wu | 345/166 |
| 2007/0164999 A1 | * | 7/2007 | Gruhlke | 345/166 |

* cited by examiner

*Primary Examiner* — Thanh X Luu
(74) *Attorney, Agent, or Firm* — Finnegan, Henderson, Farabow, Garrett, & Dunner, LLP

(57) ABSTRACT

An optical motion tracking device (10) includes a photo detector array (18) comprised of highly sensitive photo sensors coupled to a computational circuit (19) inside a casing (11). The photo detector array (18) detects optical features of a surface (25) using ambient light reflected from or propagated through the surface (25) and transmitted into the casing through an aperture (15). Protrusions (14) on the bottom (10) lifts the device (10) from the surface (25) and allow the ambient light to illuminate the surface (25). A nontransparent sidewall (17) encloses a light path from the aperture (15) to the photo detector array (18) to reduce light interference. A reflective band (32) near the aperture (15) to increases the illumination of the surface (25). The computational circuit (19) calculates the correlation between the images from the photo detector array (18) to track the motion of the device (10).

16 Claims, 2 Drawing Sheets

10

OPTICAL MOTION SENSING DEVICE WITH AMBIENT LIGHT SENSING

FIELD OF THE INVENTION

The present invention generally relates to motion sensing, more particularly, to optical motion sensing is such applications as computer pointing devices.

BACKGROUND OF THE INVENTION

A computer pointing device, generally referred to as a mouse, is one of the most commonly used devices for computer interface devices. A user moves the mouse on a surface. A motion sensing mechanism in the mouse senses the motion and moves a cursor on the computer display accordingly. There are generally two types of motion sensing mechanisms, mechanical motion sensing and optical motion sensing.

A mechanical motion sensing mechanism generally includes a tracking ball at the bottom of the mouse and mechanically coupled to two tracking wheels. When the mouse moves on a surface, e.g., a mouse pad or desk surface, the rolling ball rolls. The tracking wheels convert the rolling motion of the rolling ball into electrical signals to control the movement of a cursor on the computer display. A mechanical motion sensing mouse is susceptible to damage and performance deterioration resulting from dirt accumulation and wear.

An optical motion sensing mechanism generally includes a light emitting device, e.g., a light emitting diode and an array of photo detectors. The array of photo detectors senses a light beam emitted from the light emitting device and reflected by a surface under the mouse. As the user moves the mouse over the surface, features on the surface, e.g., colors, textures, reflectivity, in different regions of the surface, move relative to the array of photo detectors. The photo detector array senses the reflected light beam and decodes the mouse motion with respect to the surface from the light beam variation. In an optical mouse, the light emitting device is a major power consumption element. For a wireless mouse, the light emitting device may be a predominant factor determining the battery life.

Accordingly, it would be advantageous to have a computer pointing device, e.g., a mouse, having a power efficient motion sensing mechanism. It is desirable for motion sensing mechanism to be reliable. It is also desirable for the mouse to have high performance. It is of further advantage for the mouse be simple, convenient to use, and cost efficient.

DETAILED DESCRIPTION OF VARIOUS EMBODIMENTS

Figure 1:
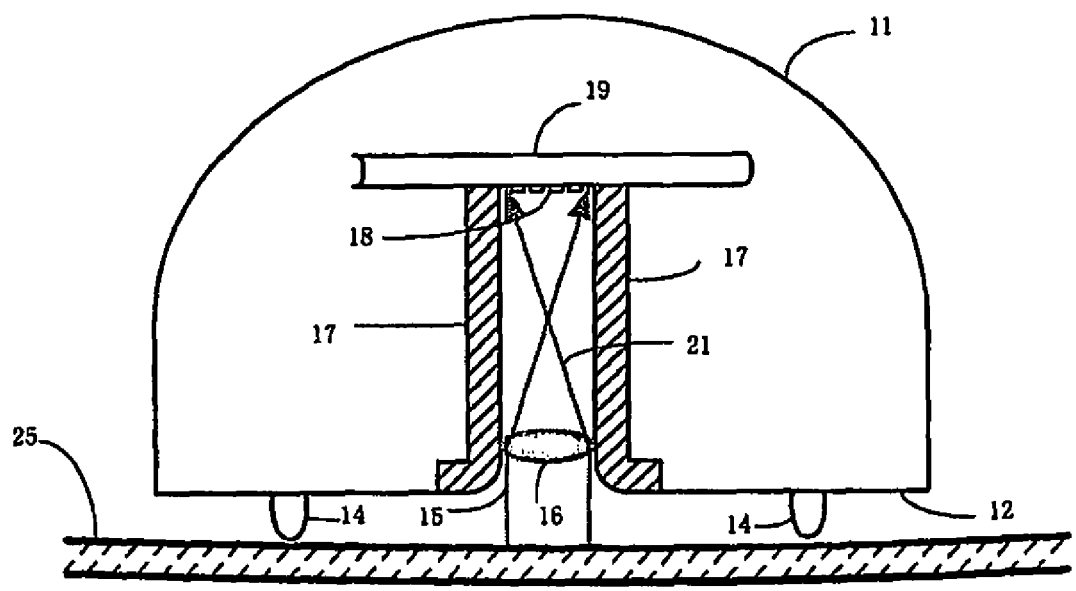
FIG. 1 is a schematic diagram illustrating an optical motion sensing device in accordance with an embodiment of the present invention.

Various embodiments of the present invention are described herein below with reference to the figures, in which elements of similar structures or functions are represented by like reference numerals throughout the figures. It should be noted that the figures are only intended to facilitate the description of the preferred embodiments of the present invention. They are not intended as an exhaustive description of the present invention or as a limitation on the scope of the present invention. In addition, the figures are not necessarily drawn to scale.

FIG. 1 is a schematic diagram illustrating a cross sectional view of an optical motion sensing device 10 in accordance with an embodiment of the present invention. By way of example, FIG. 1 shows motion sensing device 10 as an optical mouse generally used for moving a cursor on a computer display. Mouse 10 has a shell, an enclosure, or an outer casing 11, which may be made of plastic or some other materials. Preferably, outer casing 11 has a shape that is user friendly. Outer casing 11 has a bottom 12. Bottom 12 and the top section of outer casing 11 may be integrally formed together or be two pieces attached to each other. FIG. 1 shows bottom 12 being substantially planar. When mouse 10 is placed on a surface 25, e.g., a desk, a mouse pad, etc., a plurality of protrusions 14 on bottom 12 lifts bottom 12 from surface 25 and keeps a gap there between. In a preferred embodiment, protrusions 14 are located near the periphery of bottom 12 and more or less evenly spaced apart from each other, thereby providing a stable support of mouse 10 on surface 25. Protrusions 14 lift bottom 12 away from surface 25, thereby allowing ambient light illuminating surface 25 under bottom 12. The height of protrusions 14 is preferably such as to provide easy use of mouse 10 while maximizing the amount of ambient light between bottom 12 and surface 25. In a preferred embodiment, protrusions 14 have a height between about 0.1 millimeter (mm) and 3 mm. In accordance with an embodiment of the present invention, protrusions 14 are formed integrally with bottom 12. In accordance with another embodiment, protrusions 14 are attached to bottom 12.

Bottom 12 has an opening or aperture 15 formed therein. In a preferred embodiment, aperture 15 is formed in a central portion of bottom 12. Aperture 15 allows light to propagate into the interior of outer casing 11 of mouse 10. In a preferred embodiment, aperture 15 is circular and has a diameter between approximately 0.1 mm and approximately 10 mm, or between approximately 2 mm and approximately 5 mm. In a specific embodiment, aperture 15 has a diameter of approximately 3 mm. It should be noted that aperture 15 is not limited to being circular in shape. By way of example, aperture 15 can be elliptical, square, rectangular, triangular, etc. In accordance with a preferred embodiment of the present invention, a lens 16 is disposed at aperture 15 to focus light toward a photo detector array 18 inside outer casing 11 of mouse 10. In accordance with a preferred embodiment of the present invention, photo detector array 18 is facing aperture 15 and includes a plurality of photo detectors arranged in an array. In addition, photo detector array 18 is electrically coupled to a signal processing or computational circuit 19 for processing the signals from the photo detectors.

In accordance with a specific embodiment of the present invention, the light path from aperture 15 to photo detector array 18 is enclosed by a sidewall 17. Light path sidewall 17 may be formed integrally with bottom 12 of outer casing 11 or attached to outer casing 11 through a mechanical means such as, for example, clips, screws, bolts, or the like. If outer casing 11 of mouse 10 is transparent or translucent, light path sidewall 17 is preferably nontransparent. Nontransparent light path sidewall 17 serves to block light from areas other than surface 25 and other than through aperture 15 from reaching photo detector array 18. This reduces light interference at photo detection array 18 and improves the motion tracking performance.

It should be noted that light path sidewall 17 being nontransparent is an optional feature in mouse 10 in accordance with the present invention. When outer casing 11 is nontransparent, only light that can reach photo detector array 18 is propagated through aperture 15. In such an embodiment, there is no need to block light from areas other than surface 25. In addition, sidewall 17 itself is also optional.

In operation, photo detector array 18 senses a light beam 21 transmitted trough lens 16 at aperture 15 in bottom 12. Light beam 21 may be ambient light reflected from a surface 25, e.g., that of a mouse pad, a desk top, etc., or propagated through surface 25 when surface 25 is at least partially transparent or translucent. Light beam 21 contains information about the features, e.g., color, texture, contrast, brightness, smoothness, etc., of surface 25. When a user moves mouse 10 relative to surface 25, the information in light beam 21 varies. Photo detector array 18 senses the variation and computational circuit 19 computes the motion of mouse 10 with respect to surface 25 from the information variation in light beam 21. Based on the computed mouse motion, computational circuit 19 generates a control signal to a host computer for controlling a cursor on the computer display.

It should be noted that FIG. 1 only schematically illustrates the features of mouse 10 to facilitate in the description of certain embodiments of the present invention and does not include all features or elements therein. For example, mouse 10 may include none or more than one lenses in the light paths from aperture 15 to photo detector array 18. In addition, photo detector array 18 and signal processing circuit 19 may be fabricated on a single chip or on separate chips. Mouse 10 may communicate with the host computer with or without wires. The wireless communication modes include, but are not limited to, radio frequency (RF) and infrared (IR).

Photo detector array 18 detects features in surface 25 through light beam 21. Computation circuit 19 processes the signal from photo detector array 18 and calculates the motion of mouse 10 with respect to surface 25. In accordance with a preferred embodiment of the present invention, light beam 21 is generated from ambient light reflected from or propagated through surface 25. In such embodiment, mouse 10 does not need a photo emitting device. In a prior art optical mouse, a photo emitting device, e.g., a photo emitting diode, provides a light beam illuminating a surface under the mouse. A photo sensing circuit senses the light beam reflected from the surface and calculates the mouse motion with respect to the surface from the variations in the reflected light beam. The photo emitting device is usually a significant drain of power in the mouse. It has a major impact on the battery life in a wireless mouse. In addition, the photo emitting device increases the circuit complexity and cost, and may negatively affect the reliability of the mouse.

In order to effectively and reliably track the motion of mouse 10 using ambient light, photo detector array 18 is preferably made up of highly sensitive photo detectors. In a preferred embodiment, the photo detectors have a sensitivity of about one lux. By way of example, single carrier modulation photo detector (SMPD) image sensors developed by Korea Electronics Technology Institute and Planet82, Inc. can serve to form photo detector array 18 in accordance with an embodiment of the present invention. Because SMPD image sensors can be mass produced using the standard complementary metal oxide semiconductor (CMOS) process without additional investment for facilities, mouse 10 employing SMPD sensors in photo detector array 18 in accordance with a preferred embodiment of the present invention is cost efficient In accordance with an embodiment of the present invention, photo detector array 18 is arranged in two orthogonal lines, each having the width of one pixel. A state machine in computational circuit 19 compares the output signals of the photo detector array 18 in the two orthogonal lines to sense the motion of the mouse relative the surface. In accordance with another embodiment of the present invention, photo detector array 18 is arranged in a two dimensional area shaped in a circle, ellipse, square, rectangle, or a polygon. In accordance with a preferred embodiment, the shape of photo detector array 18 is analogous to that of aperture 15. Computational circuit 19 tracks the mouse motion by calculating the correlation between a newly captured sample image and a previously captured reference image to ascertain the direction and amount of movement. Specifically, computational circuit 19 calculates the correlation by comparing the newly captured sample image with the previously captured reference image, first with the reference image kept at its original pixel and then with the reference image shifted to its neighboring pixels in a specific pattern. Computational circuit 19 may also calculate the correlation by comparing the previously captured reference image with the newly captured sample image, first with the sample image kept at its original pixel and then with the sample image shifted to its neighboring pixels in a specific pattern. In accordance with various embodiments of the present invention, the pattern may be isotropic, e.g., square, round, diamond, etc., or anisotropic, e.g., rectangular, elongated, or directional. For anisotropic patterns, computational circuit 19 preferably selects a particular anisotropic pattern based on a predicted motion orientation of mouse 10. Likewise for directional patterns, computational circuit 19 preferably selects a particular directional pattern based on a predicted motion direction of mouse 10. The history of the motion of mouse 10 may form a basis for predicting the motion of mouse 10. Proper pattern selection based on motion prediction and shifting an image in a directional or anisotropic pattern for correlation calculation may provide an efficient and reliable way for tracking the motion of mouse 10 with respect to surface 25.

In accordance with another preferred embodiment of the present invention, at least a portion of bottom 12 surrounding aperture 15 has a highly reflective surface, thereby increasing the intensity of light beam 21 reflected from surface 25. Protrusions 14 in bottom 12 preferably have a height to allow sufficient ambient light to illuminate surface 25 through the gap between bottom 12 and surface 25. In a preferred embodiment, protrusions 14 have a height between about 0.1 mm and 3 mm. In addition, outer casing 11, including bottom 12 is nontransparent and non-translucent to minimize light interference at photo detector array 18 in accordance with a specific embodiment of the present invention.

Figure 2:
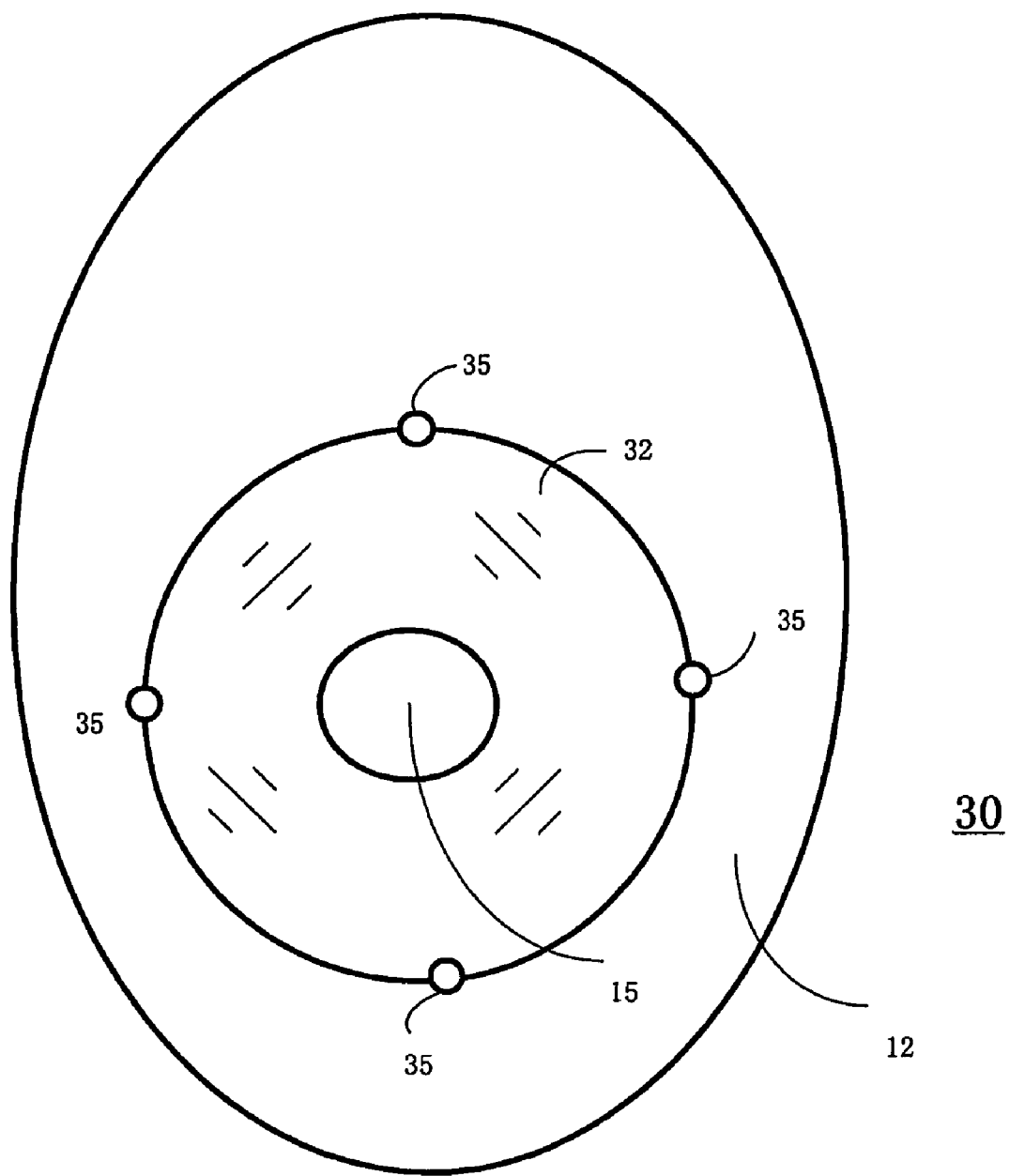
FIG. 2 is a schematic diagram illustrating an optical motion sensing device in accordance with another embodiment of the present invention.

FIG. 2 is a schematic diagram illustrating an optical mouse 30 in accordance with another preferred embodiment of the present invention. Mouse 30 is similar in structure as mouse 10 described herein above with reference to FIG. 1, and FIG. 2 illustrates a bottom view of mouse 30.

As shown in FIG. 2, mouse 30 has a highly reflective band 32 in bottom 12 surrounding aperture 15. Band 32 functions as a mirror to reflect ambient light towards surface 25 near aperture 15, thereby increasing the illumination of surface 25 and improving the motion tracking performance of mouse 10, especially under low light conditions. In accordance with a preferred embodiment of the present invention, band 32 has a concave surface that functions to focus the light onto a small portion of surface 25 near aperture 15. Band 32 may be formed by attaching a reflective film to bottom 12, electroplating bottom 12 with a reflective material, painting bottom 12 with a reflective paint, etc. By way of example, band 32 is formed from a chromium plated foil attached to bottom 12 in accordance with one embodiment of the present invention.

Also by way of example, band 32 is formed from a paste containing aluminum painted to bottom 12 in accordance with another embodiment. In an additional example, band 32 includes a surface polished objected embedded in bottom 12 adjacent aperture 15.

FIG. 2 shows band 32 as a circular band surrounding aperture 15. It should be noted that is not a limitation on the scope of the present invention, reflective band 32 can have other shapes, e.g., square, rectangular, triangular, etc. For example, reflective band 32 may have a special shape that can function as a trade dress for mouse 10. Furthermore, reflective band 32 can cover the whole surface of bottom 12 in accordance with the present invention. In accordance with another embodiment, outer casing 11 of mouse 10 is completely covered with a reflective material that functions to increase the illumination of surface 25 and provide a unique and highly decorative trade dress.

FIG. 2 also shows mouse 30 having four light emitting diodes (LEDs) 35 in bottom 12 adjacent aperture 15. In accordance with one preferred embodiment of the present invention, mouse 30 also includes a light sensing circuit or control circuit (not shown in FIG. 2) that switches on and off LEDs 35 depending on intensity of the ambient light. In a specific embodiment, the control circuit is coupled to a photo detector in photo detector array 18. When the light received at that photo detector falls below a certain level, e.g., 0.8 lux, the control circuit switches on LEDs 35, thereby enabling mouse 10 to function in dark. In accordance with another preferred embodiment, mouse 30 includes a user controlled switch for switching LEDs 35 on and off. With LEDs 35 on, mouse 10 can operate in total darkness. When there is sufficient ambient light, LEDs 35 are preferably off to increase the energy efficiency of mouse 30.

FIG. 2 shows mouse 30 having four light LEDs 35. This is not intended as limitation on the scope of the present invention. In accordance with various embodiments of the present invention, mouse 30 may include any number of LEDs, e.g., one, two, three, etc., for operating in dark. Furthermore, LEDs 35 can be replaced with other types of light emitting devices. Preferably, a light emitting device in mouse 30 has a high efficiency.

By now it should be appreciated that a highly efficient motion tracking device has been provided. In accordance with the present invention, a motion tracking device includes a photo detector array and the tracks the motion of an object, e.g., an optical mouse, with respect to a surface by detecting and calculating the variation of optical features of the surface. In accordance with a preferred embodiment of the present invention, the motion tracking device includes high sensitivity photo detectors and detects the optical feature of the surface using ambient light reflected from the surface or propagated through the surface. To further improve the performance, the device may include such features as reflective surface or mirror to increase the illumination of the surface. In accordance with another preferred embodiment, the motion tracking device includes a light emitting device that can be switched on when the ambient light is too low, thereby enabling the device to function in dark. By employing photo detectors of high sensitivity and tracking motion via only ambient light, a motion tracking device in accordance with the present invention is power efficient. High efficiency in specially beneficial in applications relying on battery power, e.g., wireless mouse.

While specific embodiments of the present invention have been described herein above, they are not intended as limitations on the scope of the invention. The present invention encompasses those modifications and variations of the described embodiments that are obvious to those skilled in the art. For example, a motion tracking device in accordance with the present invention is not limited to being a computer mouse. It can function in any other type of devices that involves motion sensing or tracking, e.g., interactive television remote control. In addition, a motion tracking device in accordance with the present invention is not limited to move on a surface. It can tracking motion by tracking the variation of features on an object at a remote distance from the device. Furthermore, the surface surrounding the aperture is not limited to be substantially planar.

The invention claimed is:

1. A motion sensing device, comprising:
 an outer casing having an aperture formed therein and a bottom;
 a plurality of photo detectors arranged in an array inside said outer casing, facing said aperture and configured to sense an ambient light there through;
 a sidewall enclosing a light path from said aperture to said plurality of photo detectors; and
 a computational circuit coupled to said plurality of photo detectors and configured to calculate a correlation function between a sequence of image signals formed by said plurality of photo detectors,
 wherein said bottom is substantially planar and said aperture is formed in a central portion of said bottom, and
 wherein at least a portion of said bottom adjacent said aperture has a surface of high reflectivity.

2. The motion sensing device of claim 1, wherein said plurality of photo detectors include photo sensing devices having a sensitivity of approximately one lux.

3. The motion sensing device of claim 1, wherein said plurality of photo detectors include a plurality of single carrier modulation photo detector image sensors.

4. The motion sensing device of claim 1, further comprising a plurality of protrusions on the bottom of said outer casing, said plurality of protrusions lifting the bottom of said outer casing from a surface when the motion sensing device is placed on the surface.

5. The motion sensing device of claim 4, wherein said plurality of protrusions are integrally formed with the bottom of said outer casing.

6. The motion sensing device of claim 4, wherein said plurality of protrusions are located around a periphery of the bottom of said outer casing.

7. The motion sensing device of claim 1, wherein said sidewall enclosing the light path from said aperture to said plurality of photo detectors is nontransparent.

8. A motion tracking device, comprising:
 a shell having a substantially planar portion;
 an opening formed in the substantially planar portion of said shell;
 a plurality of protrusions on the substantially planar portion of said shell spaced apart from each other and from said opening;
 a photo detector array inside said shell, facing said opening and configured to sense an ambient light through said opening;
 a sidewall enclosing a light path from said opening to said photo detector array inside said shell; and
 a computational circuit coupled to said photo detector array and configured to calculate a correlation function between a sequence of image signals formed by said photo detector array,
 wherein at least a portion of said substantially planar portion adjacent said opening has a surface of high reflectivity.

9. The motion tracking device of claim 8, wherein said photo detector array includes a plurality of photo sensing devices having a sensitivity of approximately one lux.

10. The motion tracking device of claim 8, wherein said photo detector array includes a plurality of single carrier modulation photo detector image sensors.

11. The motion tracking device of claim 8, wherein said opening has a diameter between approximately 0.1 millimeter and approximately 3 millimeters.

12. The motion tracking device of claim 8, further comprising:
   a light emitting device adjacent said opening; and
   a switch coupled to said light emitting device configured to switching said light emitting device on and off.

13. The motion tracking device of claim 12, wherein said switch is configured to switch said light emitting device on in response to the ambient light being below a predetermined level and switch said light emitting device off in response to the ambient light being above the predetermined level.

14. A computer mouse for controlling a cursor in response to mouse motion, comprising:
   a top casing;
   a bottom attached to said top casing and having an opening formed therein;
   a mirror attached to said bottom surrounding said opening;
   a plurality of protrusions on said bottom and spaced apart from said opening;
   a photo detector array inside between said top casing and said bottom, facing said opening and configured to sense an ambient light through said opening;
   a light path sidewall enclosing a light path from the opening in said bottom to said photo detector array; and
   a computational circuit coupled to said photo detector array and configured to generate a cursor control signal based on a motion sensing by calculating a correlation function between a sequence of image signals formed by said photo detector array.

15. The computer mouse of claim 14, wherein said photo detector array includes a plurality of single carrier modulation photo detector image sensors having a sensitivity of approximately one lux.

16. The computer mouse of claim 14, further comprising:
   a light emitting device adjacent said opening; and
   a switch coupled to said light emitting device configured to switch said light emitting device on in response to the ambient light being below a predetermined level and switch said light emitting device off in response to the ambient light being above the predetermined level.

* * * * *